(12) United States Patent
Choi et al.

(10) Patent No.: US 11,153,127 B2
(45) Date of Patent: Oct. 19, 2021

(54) METHOD FOR TRANSMITTING AND RECEIVING SRS AND COMMUNICATION DEVICE THEREFOR

(71) Applicant: LG ELECTRONICS INC., Seoul (KR)

(72) Inventors: Kukheon Choi, Seoul (KR); Jiwon Kang, Seoul (KR); Kyuseok Kim, Seoul (KR); Kilbom Lee, Seoul (KR)

(73) Assignee: LG ELECTRONICS INC.

( * ) Notice: Subject to any disclaimer, the term of this patent is extended or adjusted under 35 U.S.C. 154(b) by 0 days.

(21) Appl. No.: 16/766,667

(22) PCT Filed: Nov. 26, 2018

(86) PCT No.: PCT/KR2018/014649
§ 371 (c)(1),
(2) Date: May 22, 2020

(87) PCT Pub. No.: WO2019/103560
PCT Pub. Date: May 31, 2019

(65) Prior Publication Data
US 2020/0366531 A1     Nov. 19, 2020

Related U.S. Application Data

(60) Provisional application No. 62/590,377, filed on Nov. 24, 2017.

(51) Int. Cl.
*H04L 25/02*     (2006.01)
*H04W 76/27*     (2018.01)
(Continued)

(52) U.S. Cl.
CPC ....... *H04L 25/0226* (2013.01); *H04B 1/7143* (2013.01); *H04B 7/0695* (2013.01);
(Continued)

(58) Field of Classification Search
None
See application file for complete search history.

(56) References Cited

U.S. PATENT DOCUMENTS 11,012,216 B2 *   5/2021   Munier .................. H04L 5/0012
2012/0106438 A1 * 5/2012   Kwon .................... H04L 5/001
                                                               370/315
(Continued)

FOREIGN PATENT DOCUMENTS

WO   WO-2013173673 A2 *  11/2013  ........... H04L 5/0048
WO   2016163805          10/2016

OTHER PUBLICATIONS

Ericsson, "Details on SRS design," 3GPP TSG-RAN WG1 #90bis, R1-1718450, Oct. 2017, 13 pages.
(Continued)

*Primary Examiner* — Otis L Thompson, Jr.
(74) *Attorney, Agent, or Firm* — Lee, Hong, Degerman, Kang & Waimey

(57) ABSTRACT

A method for transmitting, by a terminal, a sounding reference signal (SRS) comprises: a step of, if an SRS transmission and a transmission of an uplink channel collide in a first slot, dropping the transmission of an SRS symbol colliding in the first slot and transmitting an SRS symbol not colliding in the first slot; and a step of transmitting an SRS symbol in a second slot on the basis of a hopping pattern set for the dropped SRS symbol, wherein when the transmission count of the last SRS symbol colliding in the first slot is K, the transmission count for the first SRS symbol transmitted in the second slot is K+1.

14 Claims, 10 Drawing Sheets

(51) Int. Cl.
*H04B 1/7143* (2011.01)
*H04B 7/06* (2006.01)
*H04L 5/00* (2006.01)
*H04W 72/04* (2009.01)

(52) U.S. Cl.
CPC ......... *H04L 5/005* (2013.01); *H04W 72/0446* (2013.01); *H04W 76/27* (2018.02)

(56) References Cited

U.S. PATENT DOCUMENTS

| | | | | |
|---|---|---|---|---|
| 2013/0301564 | A1* | 11/2013 | Chen | H04L 5/0091 370/329 |
| 2013/0322363 | A1* | 12/2013 | Chen | H04L 5/0053 370/329 |
| 2015/0195063 | A1 | 7/2015 | Ro et al. | |
| 2015/0372792 | A1* | 12/2015 | Damnjanovic | H04W 72/02 370/329 |
| 2018/0007707 | A1* | 1/2018 | Alvarino | H04L 5/0096 |
| 2019/0165971 | A1* | 5/2019 | Manolakos | H04L 5/0048 |
| 2020/0304265 | A1* | 9/2020 | Kim | H04B 7/2615 |

OTHER PUBLICATIONS

Huawei, HiSilicon, "Remaining details of SRS design," 3GPP TSG-RAN WG1 #91, R1-1719441, Dec. 2017, 12 pages.
LG Electronics, "On SRS Design," 3GPP TSG-RAN WG1 NR #91, R1-1719914, Dec. 2017, 3 pages.
PCT International Application No. PCT/KR2018/014649, Written Opinion of the International Searching Authority dated Mar. 26, 2019, 15 pages.

* cited by examiner

[FIG. 1]
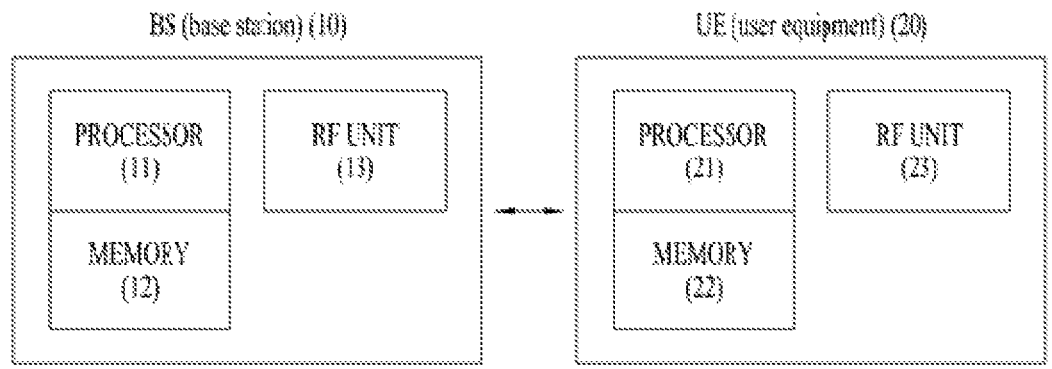
[FIG. 2A]
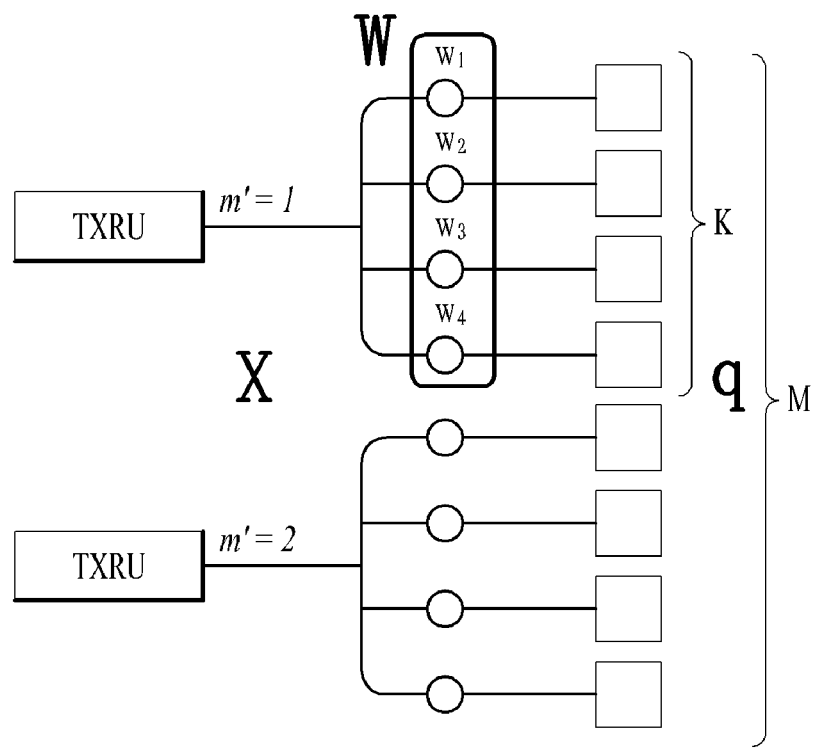

[FIG. 2B]
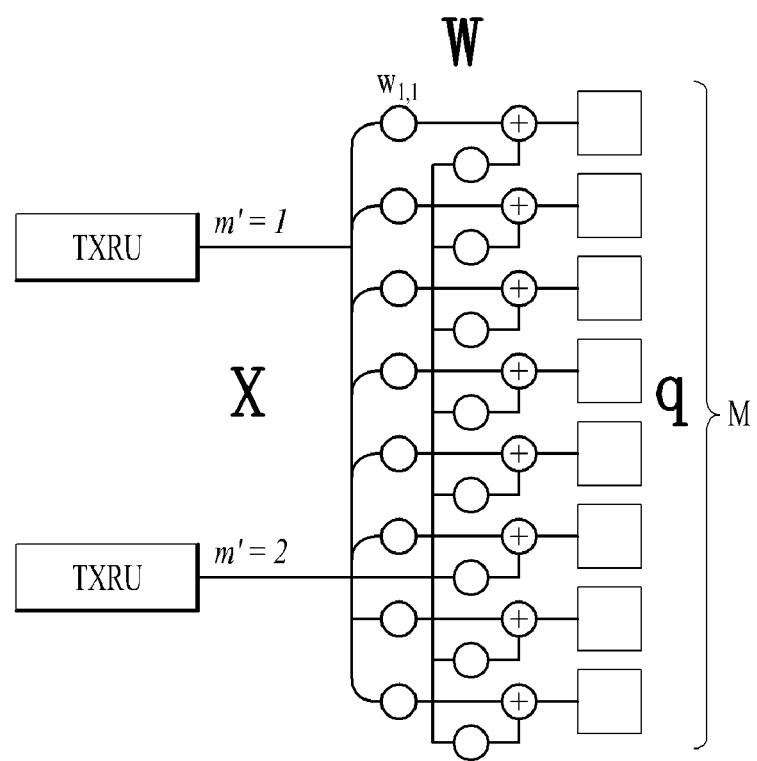

[FIG. 3]
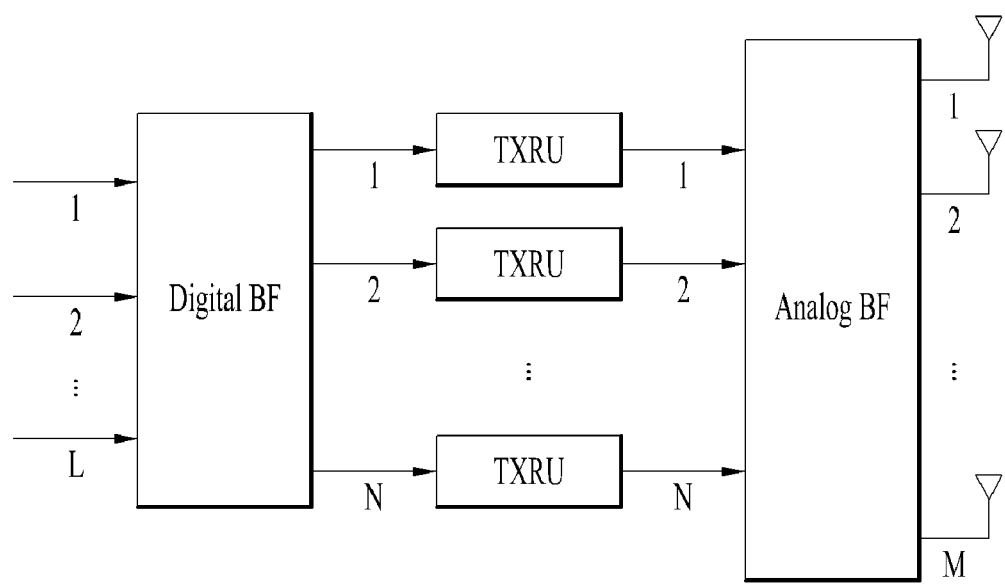

[FIG. 4]
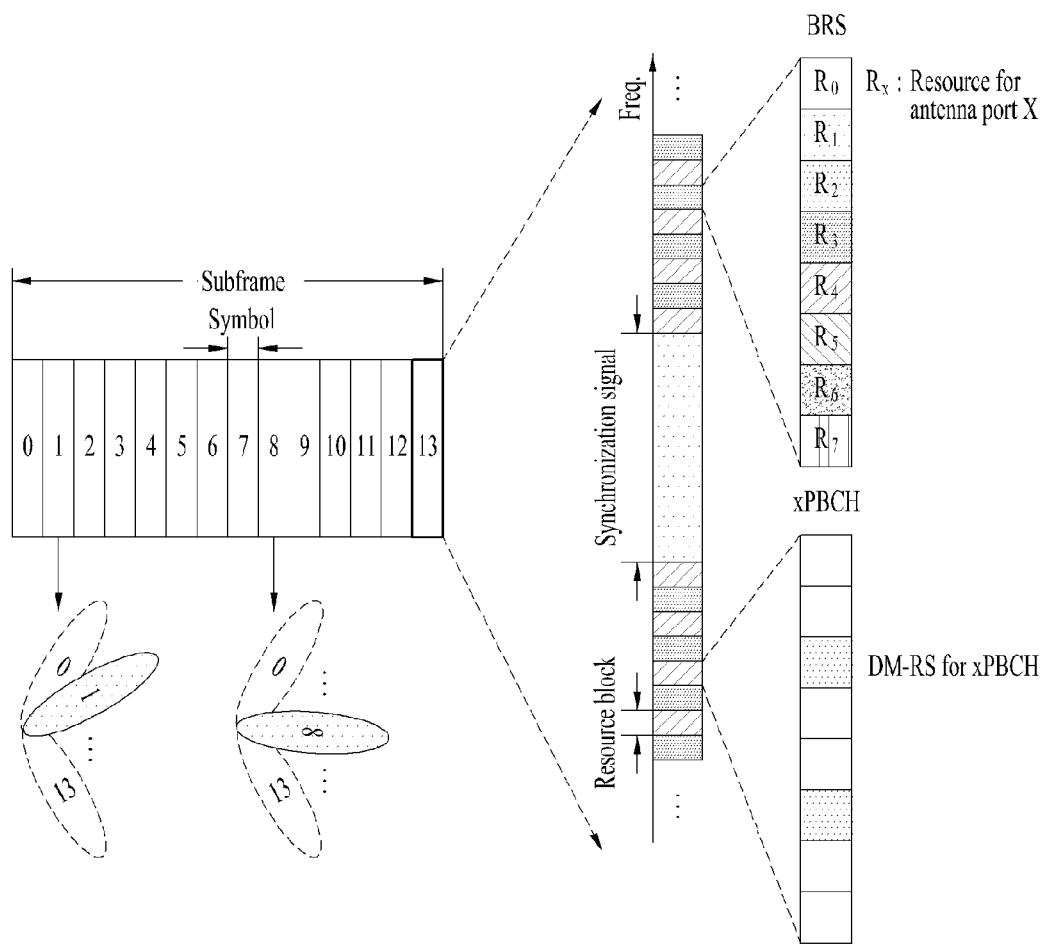

[FIG. 5]
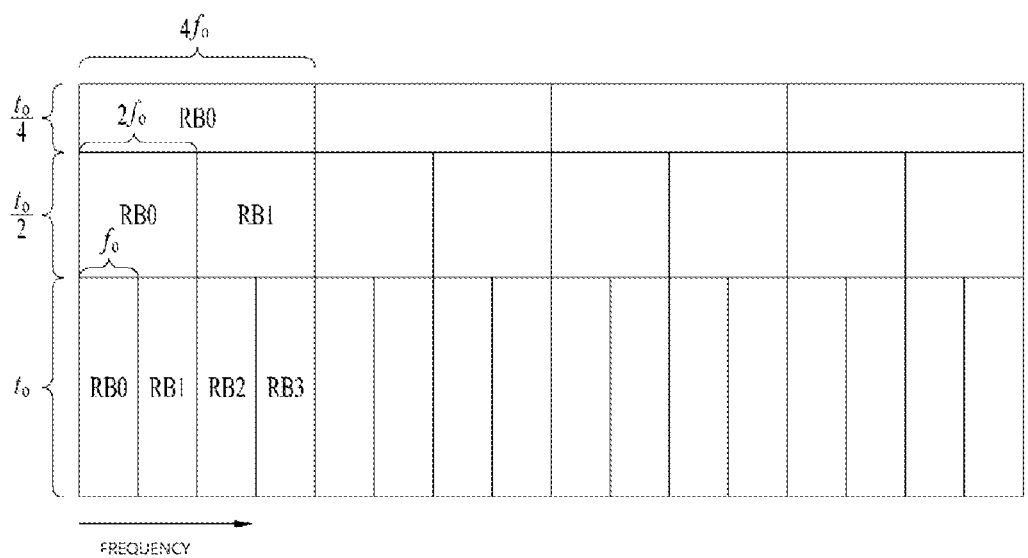
[FIG. 6]
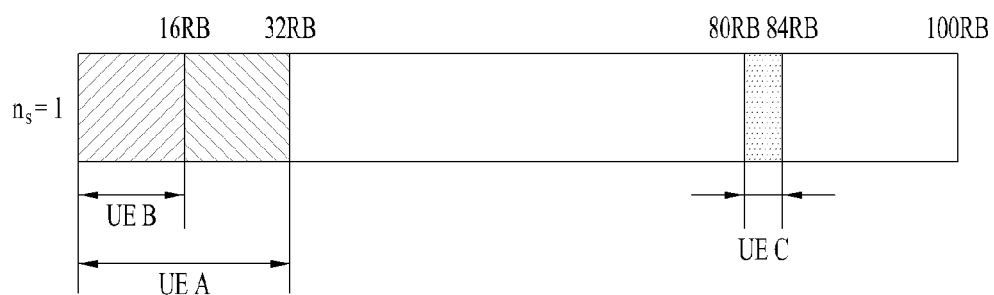
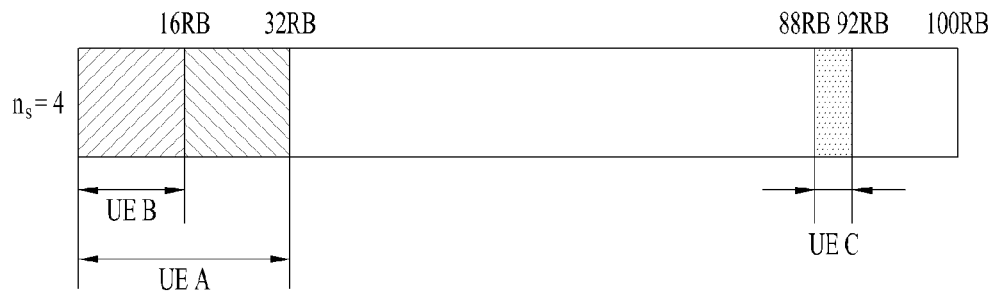

[FIG. 7]
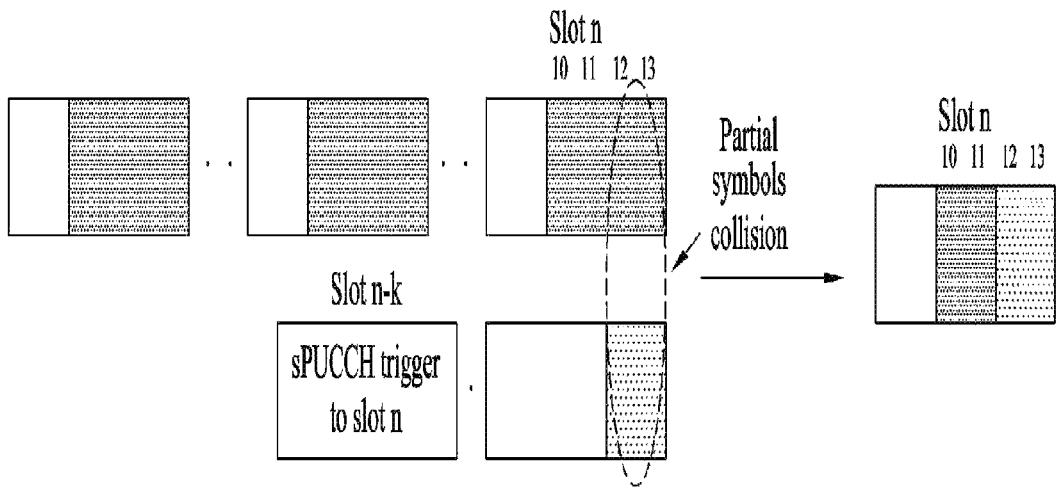
[FIG. 8]
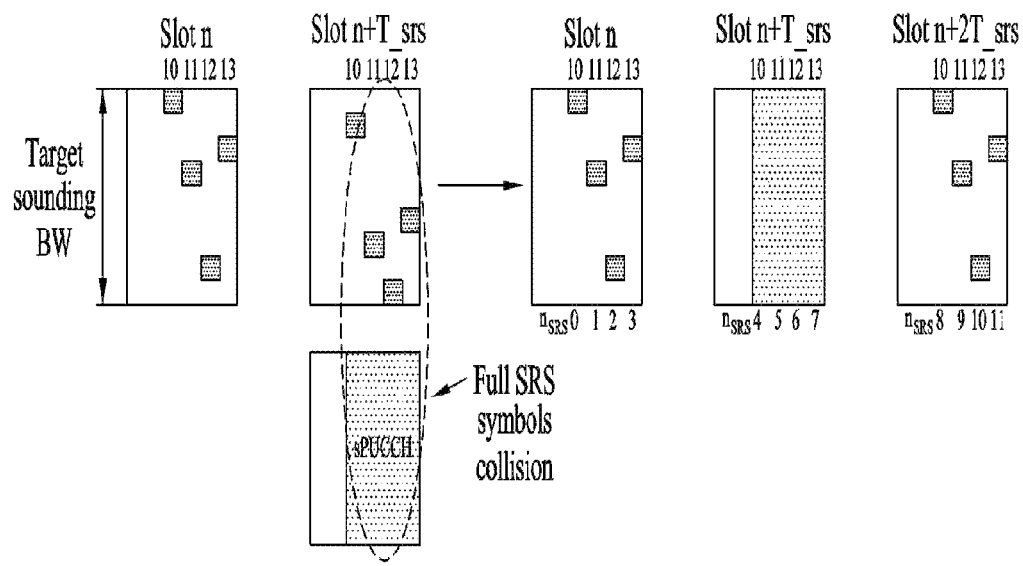

[FIG. 9]
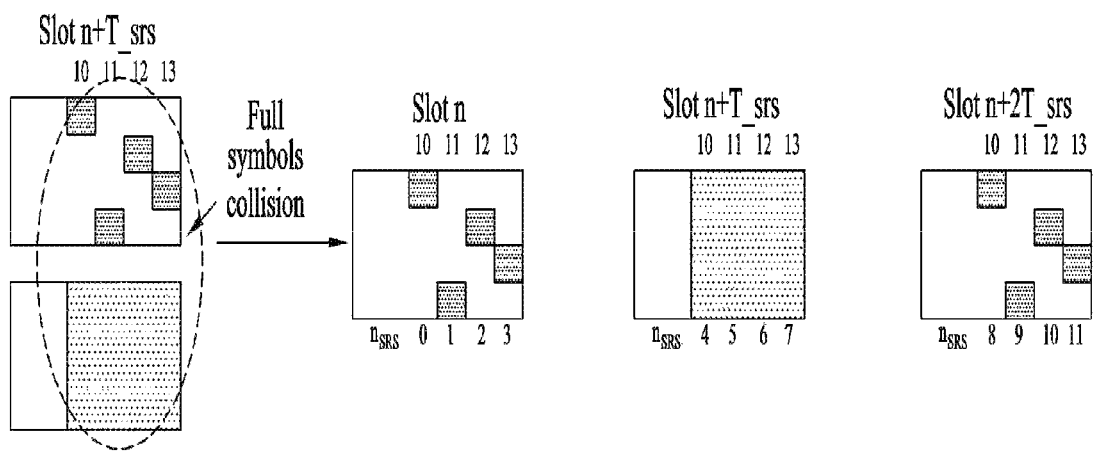
[FIG. 10]
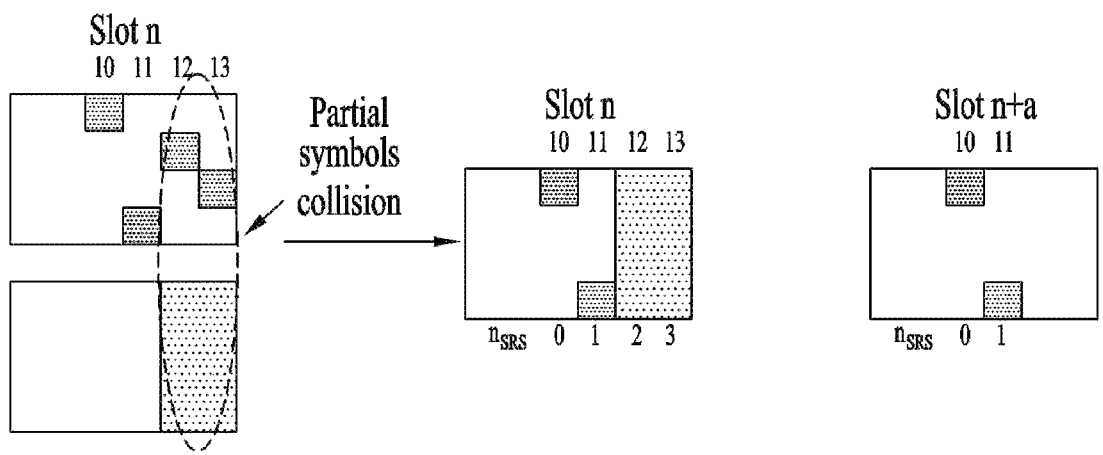

[FIG. 11]
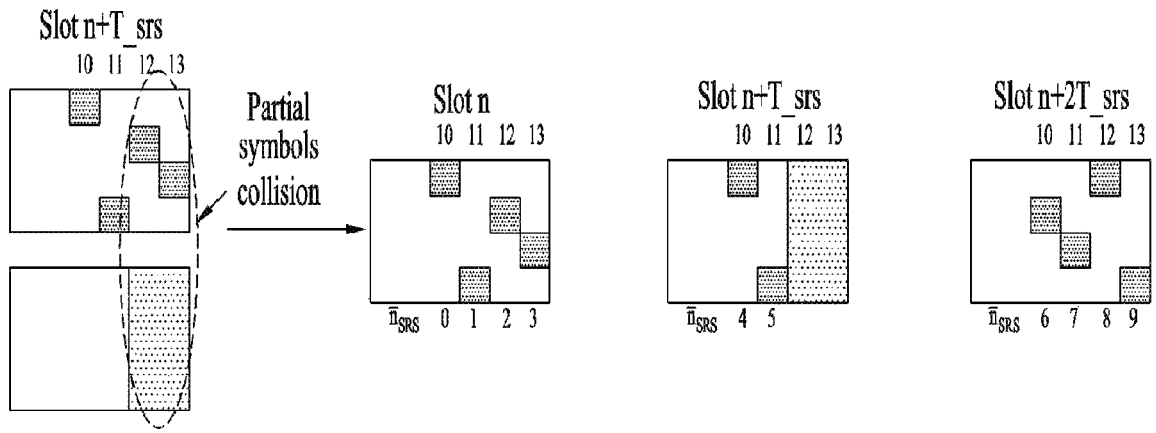
[FIG. 12]
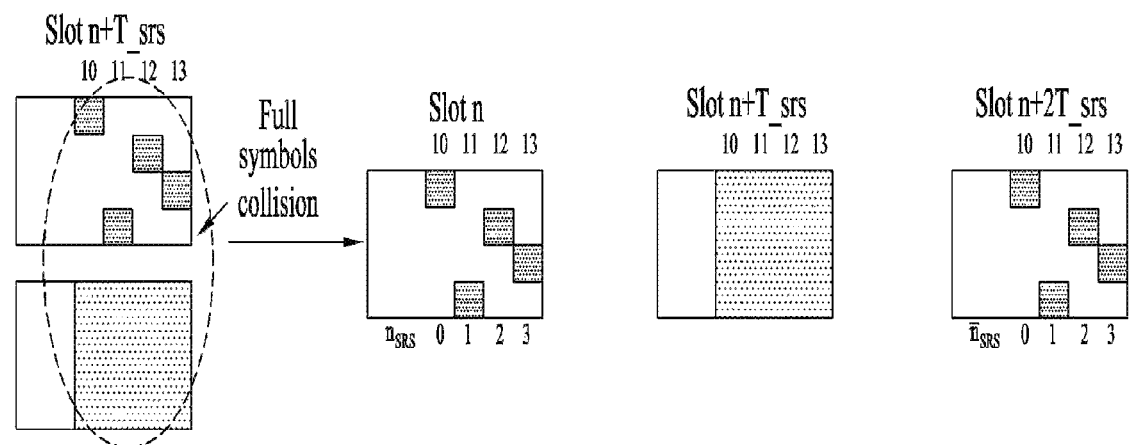

[FIG. 13]
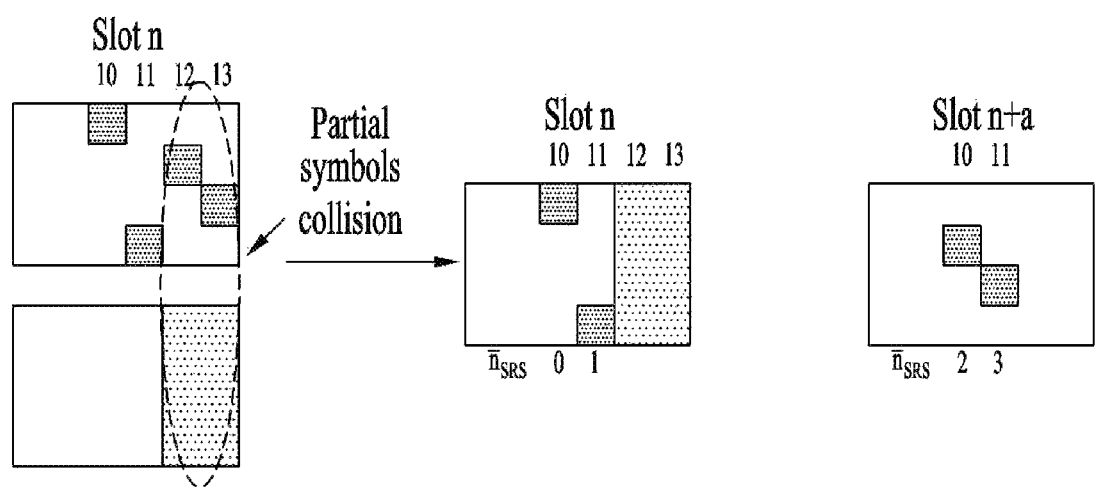

[FIG. 14]
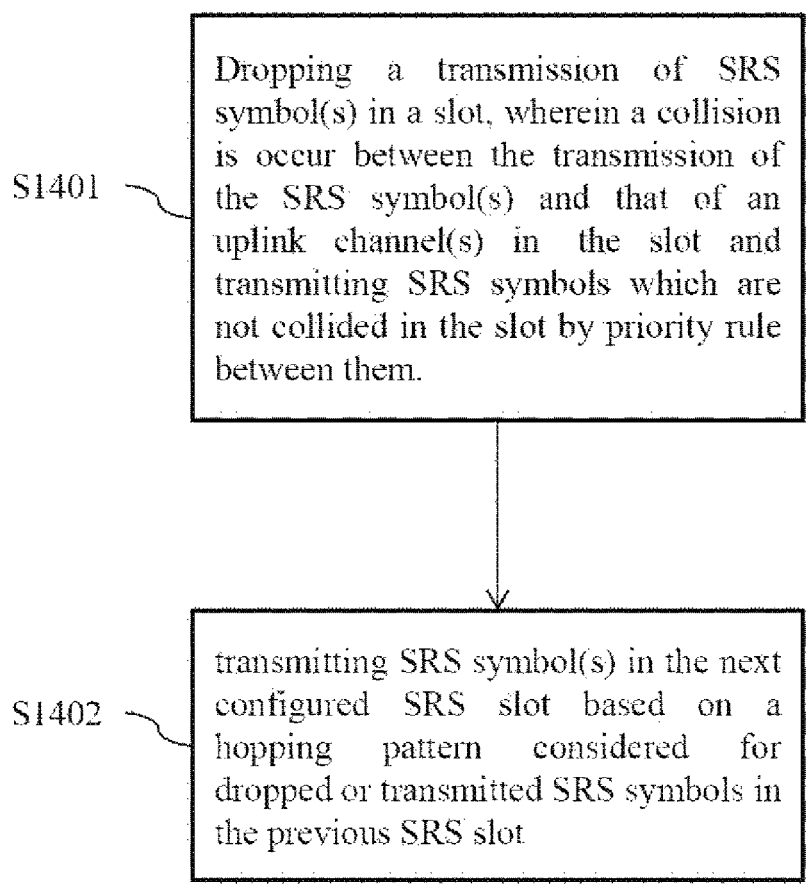

METHOD FOR TRANSMITTING AND RECEIVING SRS AND COMMUNICATION DEVICE THEREFOR

CROSS-REFERENCE TO RELATED APPLICATIONS

This application is the National Stage filing under 35 U.S.C. 371 of International Application No. PCT/KR2018/014649, filed on Nov. 26, 2018, which claims the benefit of U.S. Provisional Application No. 62/590,377, filed on Nov. 24, 2017, the contents of which are all hereby incorporated by reference herein in their entirety.

TECHNICAL FIELD

The present disclosure relates to a wireless communication system, and more particularly, to methods for transmitting and receiving a sounding reference signal (SRS) and communication devices therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile Broadband (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

DETAILED DESCRIPTION OF DISCLOSURE

Technical Tasks

An object of the present disclosure is to provide a method of transmitting an SRS by a user equipment (UE).

Another object of the present disclosure is to provide a method of receiving an SRS by a base station (BS).

Another object of the present disclosure is to provide a UE for transmitting an SRS.

Another object of the present disclosure is to provide a BS for receiving an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

To achieve the above technical tasks, according to one embodiment of the present disclosure, a method of transmitting a Sounding Reference Signal (SRS) by a user equipment may include if SRS transmission and transmission of an uplink channel collide with each other in a first slot, dropping the transmission of an SRS symbol having the collision occurrence in the first slot and transmitting an SRS symbol not having the collision occurrence in the first slot and transmitting an SRS symbol in a second slot based on a hopping pattern configured for the dropped SRS symbol, wherein when a transmission count of a last SRS symbol not having the collision occurrence in the first slot is K, a transmission count for a first SRS symbol transmitted in the second slot may be K+1.

The second slot may include a slot having SRS transmission configured after the first slot.

To achieve the above technical tasks, according to one embodiment of the present disclosure, a user equipment transmitting a Sounding Reference Signal (SRS) may include a processor and a Radio Frequency (RF) unit transmitting or receiving a radio signal by being combined with the processor 21, wherein the processor is configured to if SRS transmission and transmission of an uplink channel collide with each other in a first slot, drop the transmission of an SRS symbol having the collision occurrence in the first slot, transmit an SRS symbol not having the collision occurrence in the first slot, and transmit an SRS symbol in a second slot based on a hopping pattern configured for the dropped SRS symbol and wherein when a transmission count of a last SRS symbol not having the collision occurrence in the first slot is K, a transmission count for a first SRS symbol transmitted in the second slot is K+1.

The transmission count K may not include a transmission count for the SRS symbol having the collision occurrence.

The hopping pattern may be determined based on the transmission count.

The transmission count of the first SRS symbol having the collision occurrence in the first slot may be K+1 that is equal to the transmission count of a first symbol of the second SRS.

Information on the hoping pattern may be provided through Radio Resource Control (RRC).

The SRS may include a periodic or semi-periodic SRS and wherein the uplink signal includes Physical Uplink Control Channel (PUCCH).

The SRS may include an aperiodic SRS and the uplink signal may include Physical Uplink Control Channel (PUCCH) including a beam failure recover request.

Advantageous Effects

According to an embodiment of the present disclosure, in transmitting SRS, as SRS symbols are dropped due to the collision with another UL channel on resource hopping, when a time taken for full sounding of a target BW on hopping is increased, such a delay can be reduced by modifying the counting of SRS transmission parameter.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIG. 1 is a diagram illustrating a wireless communication system for implementing the present disclosure.

FIG. 2a is a diagram illustrating TXRU virtualization model option 1 (sub-array model) and FIG. 2b is a diagram illustrating TXRU virtualization model option 2 (full connection model)

FIG. 3 is a block diagram for hybrid beamforming.

FIG. 4 is a diagram illustrating beams mapped to BRS symbols in hybrid beamforming.

FIG. 5 is a diagram illustrating symbol/sub-symbol alignment between different numerologies.

FIG. 6 is a diagram illustrating an LTE hopping pattern.

FIG. 7 is a diagram showing an example of NR priority rule (partial SRS symbols dropping) on collision between periodic/semi-persistent SRS and sPUCCH.

FIG. 8 is a diagram showing an example of SPUCCH collision (P/SP SRS) when a sounding is configured in a manner that $n_{SRS}$ covers slots by a period of 8 symbols.

FIG. 9 is a diagram showing an example of SPUCCH collision when a sounding is configured in a manner that $n_{SRS}$ covers a single slot.

FIG. 10 is a diagram showing an example of a sounding problem on a partial symbols dropping of AP SRS.

FIG. 11 is a diagram showing an example of a modified SRS transmission counting $\bar{n}_{SRS}=n_{SRS}(n,l',r)-(n_{SRS}''-n_{SRS}')\ldots$ FIG. 12 is a diagram showing an example of a modified SRS transmission counting initialization.

FIG. 13 is a diagram showing an example of a SRS transmission counting modified when a partial symbol is dropped due to collision between AP SRS and PUCCH.

FIG. 14 is a block diagram showing a process of transmitting an SRS signal by a user equipment according to one embodiment of the present disclosure.

BEST MODE FOR DISCLOSURE

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On DL, a transmitter may be a part of the BS and a receiver may be a part of the UEs 20. On UL, the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Sequence Hopping in LTE

A root value is set in a manner of being divided into a group hopping number (u) and a sequence hopping number (v) as follows.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

A sequence-group number u in a slot $n_s$ is determined according to a group hopping pattern $f_{gh}(ns)$ and a sequence-shift pattern $f_{ss}$ as follows.

$$u = (f_{gh}(n_s) + f_{ss}) \bmod 30$$

There are 17 different hopping patterns and 30 different sequence-shift patterns. Sequence group hopping may be enabled or disabled through a cell-specific parameter Group-hopping-enabled that is provided by a higher layer. Unless PUSCH for a specific UE corresponds to a retransmission of the same transport block as a part of contention based on a Random Access Response Grant or a random access procedure, although sequence-group hopping is not enabled in cell unit, the sequence-group hopping may be disabled through a higher layer parameter Disable-sequence-group-hopping.

A group hopping pattern $f_{gh}(n_s)$ may differ for PUSCH, PUCCH, and SRS, which is expressed as follows.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

A pseudo-random sequence c(i) is defined in Clause 7.2. A pseudo-random sequence generator is initialized into $$c_{init} = \left\lfloor \frac{n_{ID}^{RS}}{30} \right\rfloor$$

at a start part of each radio frame, and $n_{ID}^{RS}$ is given by Clause 5.5.1.5.

For SRS, a sequence-shift pattern $f_{ss}^{SRS}$ is given by $f_{ss}^{SRS} = n_{ID}^{RS} \bmod 30$, where $n_{ID}^{RS}$ is given by Clause 5.5.1.5.

Sequence hopping only applies for reference-signals of length $M_{sc}^{RS} \geq 6N_{sc}^{RB}$.

For reference-signals of length $M_{sc}^{RS} < 6N_{sc}^{RB}$, the base sequence number v within the base sequence group is given by v=0.

For reference-signals of length $M_{sc}^{RS} \geq 6N_{sc}^{RB}$, the base sequence number v within the base sequence group in slot $n_s$ is defined as follows.

$$v = \begin{cases} c(n_s) & \text{if group hopping is disabled and sequence hopping is enabled} \\ 0 & \text{otherwise} \end{cases}$$

Here, a pseudo-random sequence c(i) is given by Clause 7.2. A parameter sequence-hopping-enabled provided to a higher layer determines whether sequence hopping is enabled.

For SRS, the pseudo-random sequence c(i) is defined in Clause 7.2. A pseudo-random sequence generator is initialized with $$c_{init} = \left\lfloor \frac{n_{ID}^{RS}}{30} \right\rfloor \cdot 2^5 + (n_{ID}^{RS} + \Delta_{ss}) \bmod 30$$

at the beginning of each radio frame, $n_{ID}^{RS}$ is given by Clause 5.5.1.5, and $\Delta_{ss}$ is given by Clause 5.5.1.3, where $\Delta_{ss} \in \{0, 1, \ldots, 29\}$ is set cell-specifically by a higher layer.

In sounding reference signals, it is $n_{ID}^{RS} = N_{ID}^{cell}$.

Pseudo-Random Sequence Generation in LTE

Pseudo-random sequences are defined as a gold sequence having a length of 31. When n=0, 1 ... $M_{PN}$−1, an output sequence c(n) having a length of $M_{PN}$ is defined as follows.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

Here, $N_C = 1600$, and a first m-sequence is initialized with $x_1(0) = 1$, $x_1(n) = 0$, where n=1, 2 ... 30. Initialization of a second m-sequence is denoted by $c_{init} = \sum_{i+0}^{30} x_2(i) \cdot 2^i$ with a value depending on the application of the sequence.

Analog Beamforming

In a millimeter wave (mmW) system, since a wavelength becomes shorter, a plurality of antenna elements may be installed in the same area. That is, considering that the wavelength at a band of 30 GHz is 1 cm, a total of 64 (88) antenna elements may be installed in a 4×4 cm panel at intervals of 0.5 lambda (wavelength) in the case of a 2-dimensional array. Therefore, in the mmW system, it is possible to improve coverage or throughput by increasing beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

As an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

FIG. 2a is a diagram illustrating TXRU virtualization model option 1 (sub-array model) and FIG. 2b is a diagram illustrating TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1-to-1 or 1-to-many.

Hybrid Beamforming

FIG. 3 is a block diagram for hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a diagram illustrating beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Features of NR Numerology

In NR, a method of supporting scalable numerology is being considered. That is, a subcarrier spacing of NR is represented as (2n×15) kHz, where n is an integer. From a nested viewpoint, a subset or a superset (at least 15, 30, 60, 120, 240, and 480 kHz) of the above subcarrier spacing is being considered as a main subcarrier spacing. Symbol or sub-symbol alignment between different numerologies has been configured to be supported by performing control to have the same cyclic prefix (CP) overhead ratio according to a subcarrier spacing. FIG. 5 is a diagram illustrating symbol/subsymbol alignment between different numerologies.

In addition, numerology is determined to have a structure for dynamically allocating time/frequency granularity according to services (eMMB, URLLC, and mMTC) and scenarios (high speed, etc.).

The following main agreements are made in new RAT (NR).

A maximum bandwidth allocated per NR carrier is 400 MHz.

Details of up to 100 MHz are specified in standard specification Rel 15.

Scalable numerology is adopted. That is, 15 kHz*(2n) (15 to 480 kHz) is used.

One numerology has one subcarrier spacing (SCS) and one CP. Each SCS and CP are configured by RRC.

A subframe has a fixed length of 1 ms (a transmission time interval (TTI) is a unit of a slot (14 symbols), a mini-slot (in the case of URLLC), or a multi-slot depending on the SCS or purpose (e.g., URLLC), and the TTI is also configured by RRC signaling (one TTI duration determines how transmission is made on a physical layer)).

That is, all numerologies are aligned every 1 ms.

The number of subcarriers in each resource block (RB) is fixed to 12.

The number of symbols in a slot is 7 or 14 (when an SCS is lower than 60 kHz) and 14 (when an SCS is higher than 60 kHz).

NR PUCCH Formats

Physical uplink control channel (PUCCH) formats may be classified according to duration/payload size.

A short PUCCH has format 0 (<=2 bits) or format 2 (>2 bits).

A long PUCCH has format 1 (<=2 bits), format 3 (>2, [>N] bits), or format 4 (2>2, [<=N] bits).

In regard to a PUCCH, a transmit diversity scheme is not supported in Rel-15.

Simultaneous transmission of a PUSCH and PUCCH by the UE is not supported in Rel-15.

TABLE 1

| Format | PUCCH length in OFDM symbols | Number of bits | [Usage] | Etc. |
|---|---|---|---|---|
| 0 | 1-2 | <=2 | HARQ, SR | Sequence selection |

TABLE 1-continued

| Format | PUCCH length in OFDM symbols | Number of bits | [Usage] | Etc. |
|---|---|---|---|---|
| 1 | 4-14 | <=2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [<=N] | HARQ, CSI, [SR] | DFT-s-OFDM (Pre DFT OCC) |

Features of SRS Hopping in LTE System

SRS hopping is performed only in the case of periodic SRS triggering (i.e., triggering type 0).

Allocation of SRS resources is given by a predefined hopping pattern.

A hopping pattern may be UE-specifically configured through RRC signaling (however, overlapping is not allowed).

The SRS is hopped in the frequency domain by applying a hopping pattern to each subframe in which a cell/UE-specific SRS is transmitted.

An SRS starting location and hopping formula in the frequency domain are defined by Equation 1 below.

$$k_0^{(p)} = \bar{k}_0^{(p)} + \sum_{b=0}^{B_{SRS}} K_{TC} M_{sc,b}^{RS} n_b \quad \text{[Equation 1]}$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2)\left\lfloor \frac{n_{SRS} \bmod \prod_{b'=b_{hop}}^{b} N_{b'}}{\prod_{b'=b_{hop}}^{b-1} N_{b'}} \right\rfloor + \\ \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

where $n_{SRS}$ denotes a hopping interval in the time domain, $N_b$ denotes the number of branches allocated to a tree level b, and b may be determined by setting $B_{SRS}$ in dedicated RRC.

FIG. 6 is a diagram illustrating an LTE hopping pattern (ns=1→ns=4).

An example of configuring the LTE hopping pattern will now be described.

LTE hopping pattern parameters may be set through cell-specific RRC signaling. For example, CSRS=1, $N_{RB}^{UL}$=100, of =1, and ns=1 may be set.

Next, the LTE hopping pattern parameters may be set through UE-specific RRC signaling. For example, BSRS=1, bhop=0, nRRC=22, and TSRS=10 may be configured for UE A; BSRS=2, bhop=0, nRRC=10, and TSRS=5 may be configured for UE B; and BSRS=3, bhop=2, nRRC=23, and TSRS=2 may be configured for UE C.

Features of NR Antenna Switching

In NR, inter-slot and intra-slot antenna switching is supported. For intra-slot antenna switching, a guard period may be configured. In the case of 1T2R (or 1Tx2Rx) and 2T4R (or 2Tx4Rx), the UE is configured with two SRS resources each corresponding to one symbol or two symbols. In the case of 1T4R (or 1Tx4Rx), the UE is configured with 4 SRS resources each corresponding to a single symbol and a single port. Each port of the configured resources is associated with a different UE antenna.

Agreement determined in RAN1 #90 is shown in Table 2.

TABLE 2

In the case of collision of SRS and short PUCCH carrying only CSI report beam failure recover request, support the prioritization rules in the table below:
The channel listed in the entries below are prioritized.

| | Aperiodic SRS | Semi-persistent SRS | periodic SRS |
|---|---|---|---|
| sPUCCH with aperiodic CSI report only | No rule** | sPUCCH | sPUCCH |
| sPUCCH with semi persistent CSI report only | SRS | sPUCCH | sPUCCH |
| sPUCCH with periodic CSI report only | SRS | sPUCCH | sPUCCH |
| sPUCCH with beam failure recover request* | sPUCCH | sPUCCH | sPUCCH |

In case SRS is dropped, dropping can be partial in time domain, i.e., only those OFDM symbols that collide with short PUCCH
*If short PUCCH is supported for beam failure recovery request and collision between short PUCCH with beam failure When SRS rounding is applied on collision between SRS and sPUCCH or another UL channel, SRS resources in a single slot may experience partial symbols dropping or full symbols dropping of all SRS symbols according to a priority rule. Regarding such a collision operation, a BS and a UE operate according to a predefined priority rule.

FIG. 7 is a diagram showing an example of NR priority rule (partial SRS symbols dropping) on collision between periodic/semi-persistent SRS and sPUCCH. Slots shown in FIG. 7 include SRS-configured slots only.

In FIG. 7, as an example, P/SP SRS transmission is configured on symbols 10 to 13. In this case, regarding a slot n, if sPUCCH with aperiodic CSI reporting is transmitted in symbols 12 and 13, the symbols 12 and 13 collide with each other. Yet, according to a predefined priority rule, SRS is transmitted in symbols 10 and 11 and sPUCCH is transmitted in symbols 12 and 13. Since ap SRS and ap PUCCH (ap CSI) are not scheduled together by a base station from the first, it is determined that collision does not occur. Moreover, since the base station performs resource scheduling, it can be obtained whether collision occurs between SRS and PUCCH. Moreover, although only sPUCCH is disclosed in Table 2, inter-IPUCCH collision may occur. In addition, since a length of PUCCH is variable, it is necessary to improve the existing $n_{SRS}$.

Here, if the counting of SRS transmission, $n_{SRS}$ is determined as a symbol level, frequency hopping and antenna switching are performed in symbol unit according to the $n_{SRS}$. Hence, regarding the definition of $n_{SRS}$, if the function state of l', r, $n_s$ and $n_f$ is considered as a function type of LTE, the following sounding problem may be caused.

FIG. 8 is a diagram showing an example of SPUCCH collision (P/SP SRS) when a sounding is configured in a manner that $n_{SRS}$ covers slots by a period of 8 symbols. Moreover, the example of FIG. 8 corresponds to a case of full SRS symbols dropping and a time of configuring a sounding that covers a slot for a target sounding BW.

As shown in FIG. 8, in case of transmitting a sounding of a whole target sounding BW in 2 contiguous SRS slots (e.g., a case that a sounding BW greater than a maximum BW sounding-possible in a single slot of UEs (e.g., cell-edge UEs) having a too-small transmittable BW is required), assume that a sounding that covers 8 SRS symbols is required. Yet, in a second slot (i.e., when $n_{SRS}$=4, 5, 6, 7), as sPUCCH and full SRS symbols (i.e., 4 symbols) collide with each other, the SRS symbols are dropped according to the priority rule. In a next slot (i.e., n+2T_srs), is a sounding is performed in a hoppling pattern when $n_{SRS}$=0, 1, 2, 3 is applied again by a hopping pattern at $n_{SRS}$=8, 9, 10, 11, the sounding according to the target BW is eventually completed after n+3T_srs passes.

FIG. 9 is a diagram showing an example of SPUCCH collision when a sounding is configured in a manner that $n_{SRS}$ covers a single slot. And, FIG. 9 corresponds to a case that a single-slot sounding is configured for a target sounding BW. In FIG. 9, since the whole SRS is dropped, a target sounding BW can be fully covered in a next slot, whereby no problem is caused.

On the other hand, in case of partial SRS symbol dropping, when a sounding that covers a slot is performed for a target sounding BW, a problem is caused.

Assuming that dropping is performed on partial symbols in FIG. 8, a sounding is not performed for a target sounding BW lime the above case of the full symbol drop. Eventually, the sounding is completed after n+3T_srs passes.

Therefore, depending on whether a sounding will be performed through several slots for a target sounding BW of the fully/partially dropped SRS symbols or in a single, slot, a sounding complete timing may be delayed.

In addition, for a target sounding BW, a problem may be caused in case of AR SRS transmission as well.

FIG. 10 is a diagram showing an example of a sounding problem on a partial symbols dropping of AP SRS.

In case of collision between AP SRS symbols and PUCCH, a target sounding may fail despite a single slot. Hence, it is important to set a sounding to be completed in a slot where a next AP SRS is triggered. For example, AP SRS is configured with 4 symbols in a slot n, whereby $n_{SRS}$=0, 1, 2, 3. As 2 last symbols are used for PUCCH, the 2 last symbols are dropped according to the priority rule. Yet, when AP is triggered in a next slot n+a, if SRS is allocated to 2 symbols and configured identical to SRS configured at a previous SRS trigger timing, a sounding for a target BW is not completed.

Such problems are caused because a resource hoping is determined according to the existing value of $$n_{SRS} = \lfloor l'/r \rfloor + \frac{N_{symbol}}{r} \times \left\lfloor \frac{(n_f \times N_s + n_s)}{T_{SRS}} \right\rfloor.$$

Here, l' indicates an OFDM symbol index.

Therefore, in order to solve this problem, it is necessary to predefine or modify how to deal with the $n_{SRS}$ value after collision.

Proposal 1

Due to the collision between P/SP SRS and other UL channels, if partial SRS symbols and/or full SRS symbols are dropped, $n_{SRS}$ may operate according to the SRS sounding configuration as follows. Here, the P/SP SRS refers to Periodic/Semi-Persistent SRS.

The above-raised problems are caused if SRS is configured across multiple slots for the sounding of a target BW, i.e., when the configured hop number is greater than the SRS symbol number $N_{sym\_srs}$, which is configured in a single slot, $$\left( i.e., \sum_{b=b_{hop}}^{B_{srs}} N_b > N_{sym\_srs} \right).$$

So to speaker, it means when the hop number ($N_b$) is greater than the $N_{sym\_srs}$ configured per slot, i.e., when SRS should be additionally transmitted in next slots because a target BW is not fully covered in a single slot.

Hence, if SRS dropping is performed after full symbols collision or partial SRS dropping is performed after partial symbols collision, SRS transmission counting may be considered as follows. For $n_{SRS}$' (e.g., a current slot n) of a symbol timing of collision occurrence in the very previous SRS slot transmission time, SRS is configured in index symbols 10 to 13 in a slot n-T_srs. In doing so, if collision occurs in the symbols 12 and 13, it means the $n_{SRS}$ that is calculated using 12 index (l'=2). Namely, regarding $n_{SRS}$'=$n_{SRS}$(n-T_srs, 2, r) and $n_{SRS}$" calculated for an earliest configured SRS symbol at a current SRS transmission slot timing (e.g., an SRS transmission counting calculated when l'=0 for SRS symbols l' in a current slot n), i.e., $n_{SRS}$"=$n_{SRS}$(n,0,r)), using the modified $\bar{n}_{SRS}$, SRS transmission counting is performed. Here, T_srs means a period of an SRS transmitted slot, 2 means a symbol index, and r means a repetition factor.

The modified SRS transmission counting $\bar{n}_{SRS}$ may be denoted by Equation 2 as follows.

$$\bar{n}_{SRS}=n_{SRS}(n,l',r)-(n_{SRS}''-n_{SRS}') \quad \text{[Equation 2]}$$

FIG. 11 shows an example of the modified SRS transmission counting $\bar{n}_{SRS}=n_{SRS}(n,l',r)-(n_{SRS}''-n_{SRS}')$.

Although $n_{SRS}$ 4, $n_{SRS}$ 5, $n_{SRS}$ 6 and $n_{SRS}$ 7 attempted transmission in a slot n+T_srs, if collision with PUCCH occurs at $n_{SRS}$ 6 and $n_{SRS}$ 7, PUCCH is transmitted according to a priority and transmission of the collision-occurring SRS is dropped. Hence, assuming that a transmission count of a last SRS symbol free from collision occurrence in the collision-occurring slot n+T_srs is set to K, the K becomes 5 in FIG. 11. Subsequently, a transmission count of a first SRS symbol transmitted in a slot n+2T_srs for transmitting a next SRS becomes K+1, and K+1 becomes 6 in FIG. 11. Hence, eventually, although collision occurs, $\bar{n}_{SRS}$ is set to have a value incremented by 1 in an SRS transmitted slot. This means that $\bar{n}_{SRS}$ does not contain a transmission count for SRS of which transmission is dropped due to collision.

Namely, if $\bar{n}_{SRS}$ is used in applying an SRS hopping pattern, since an SRS transmission count used for a next SRS transmission becomes equal to a transmission count of a dropped SRS symbol after the collision between SRS and PUCCH, a hopping pattern of the dropped SRS symbols is identical to a hopping pattern of SRS symbols transmitted thereafter.

This is generalized as Equation 3.

$$n_{SRS,C+1}=n_{SRS,C}-(n''-n') \quad \text{[Equation 3]}$$

Here, C may be referred to as a collision counter, indicate the number of slots in which SRS and PUCCH collide with each other, and have nothing to do with whether the corresponding collision is partial or full. C may be initialized when RRC connection setup is initialized.

Here, $n_{SRS,C}$ indicates a modified SRS transmission count when collisions occur C times. And, $n_{SRS,C+1}$ indicates a modified SRS transmission count when collisions occur (C+1) times. For example, when SRS is transmitted using the SRS transmission count of the C collision occurrences, if a collision occurs additionally, a collision count becomes C+1. When a next SRS is transmitted, the SRS is transmitted using $n_{SRS,C+1}$ generated from subtracting the transmission count of the dropped SRS symbols from $n_{SRC,C}$.

Once a collision occurs, transmission is made again by starting with a dropped SRS symbol, whereby an SRS completed timing is delayed.

FIG. 12 is a diagram showing an example of a modified SRS transmission counting initialization (in case of full SRS symbols dropping, $\bar{n}_{SRS}=n_{SRS}(n,l',r)-(n_{SRS}'')$.

In case of full symbols dropping, $n_{SRS}$ may be rest (initialized) in a next SRS transmission slot after collision. Namely, since all the SRS symbols are dropped in a previous slot, it is unnecessary to apply $n_{SRS}'$. Hence, it brings the same effect as initialization.

This is denoted by Equation 4.

$$\bar{n}_{SRS}=n_{SRS}(n,l',r)-(n_{SRS}'') \quad \text{[Equation 4]}$$

Equations for the modified SRS transmission counter may be configured through RRC.

Proposal 2

When Aperiodic (AP) SRS is triggered, if partial SRS symbols are dropped, a modified SRS transmission counting is applicable to the triggered AP SRS after collision.

The SRS transmission counting for the AP SRS may be basically denoted by the following equation.

$$n_{SRS}=\lfloor l'/r \rfloor$$

Assuming that the number of SRS symbols dropped by colliding in a previous AP SRS slot is $n_{drop}$, the modified SRS transmission counting used in an AP SRS slot triggered after collision is as follows.

$$\bar{n}_{SRS}=n_{SRS}(l',r)+\lfloor n_{drop}/r \rfloor \times \alpha$$

α indicates 'on' if collision occurs in an AP SRS triggered right before a currently triggered AP SRS. Otherwise, α indicates 'off'.

$$\alpha = \begin{cases} 0, \text{Previous\_AP\_SRS\_collision\_OFF} \\ 1, \text{Previous\_AP\_SRS\_collision\_ON} \end{cases}$$

Hence, it is able to dynamically determine whether to cope with collision between SRS and PUCCH if necessary. And, 'a' may be configured by RRC or DCI.

FIG. 13 shows an example of a modified SRS transmission counting when a partial symbol is dropped due to collision between AP SRS and PUCCH. Here, assume that AP SRS is configured with 2 symbols in a slot n+a. Hence, when an existing SRS transmission count is used, assuming that AP SRS includes 2 symbols, as a hopping pattern is applied using $n_{SRS}$ count 0 and $n_{SRS}$ count 1 at symbol index 10 and symbol index 11 in a slot n+a, the same frequency band as SRS transmitted in a slot n is covered only. Therefore, it is necessary to wait until a next SRS in order to cover a full target frequency band. On the contrary, if a modified SRS transmission count is used, a hopping pattern of the dropped SRS symbols is applied for a next SRS. Therefore, a full target frequency band can be covered without waiting until the next SRS.

FIG. 14 is a block diagram showing a process of transmitting an SRS signal by a user equipment according to one embodiment of the present disclosure.

A method of transmitting an SRS by a user equipment includes a step S1401 of if SRS transmission and transmission of an uplink channel collide with each other in a first slot, dropping the transmission of SRS symbol having the collision occurrence in the first slot and transmitting SRS symbol not having the collision occurrence in the first slot and a step S1402 of transmitting SRS symbol in a second slot based on a hopping pattern considering the SRS symbol dropped or transmitted in the first slot.

When a transmission count of a last SRS symbol not having the collision occurrence in the first slot is K, a transmission count for a first SRS symbol transmitted in the second slot is K+1.

Here, the second slot means a slot having an SRS transmission configured after the first slot. Namely, in case of a periodic or semi-static SRS, the first and second slots are configured according to an SRS transmission period. In case of an aperiodic SRS, the second slot is configured according to DCI and the like after the first slot.

The transmission count K does not include a transmission count for the SRS symbol having the collision occurrence. The hopping pattern is determined based on the transmission count. The transmission count of the first SRS symbol having the collision occurrence in the first slot is K+1 that is equal to the transmission count of a first symbol of the second SRS. Information on the hoping pattern is provided through Radio Resource Control (RRC). The SRS includes a periodic or semi-periodic SRS and the uplink signal includes Physical Uplink Control Channel (PUCCH). The SRS includes an aperiodic SRS and the uplink signal includes Physical Uplink Control Channel (PUCCH) including a beam failure recover request.

Hereinafter, an operation of a user equipment transmitting an SRS signal is described with reference to FIG. 1.

A user equipment transmitting a Sounding Reference Signal (SRS) includes a processor 21 and a Radio Frequency (RF) unit transmitting or receiving a radio signal by being combined with the processor 21. If SRS transmission and transmission of an uplink channel collide with each other in a first slot, the processor is configured to drop the transmission of SRS symbol having the collision occurrence in the first slot, transmit SRS symbol not having the collision occurrence in the first slot, and transmit SRS symbol in a second slot based on a hopping pattern configured for the dropped SRS symbol. When a transmission count of a last SRS symbol not having the collision occurrence in the first slot is K, a transmission count for a first SRS symbol transmitted in the second slot is K+1.

When a time taken for full sounding of a target BW on hopping as SRS symbols are dropped due to collision with another UL channel on resource hopping of NR SRS, the present technology relates to a technology indicating that a 'counting of SRS transmission' parameter is modified and used for SRS resource hopping in order to reduce such a delay. Since an available BW is extended in NR unlike LTE, the number of slots necessary for full sounding of a target BW increases. In this case, if SRS is retransmitted due to the collision between SRS and PUCCH, a takes more time. Therefore, a time taken for full sounding can be reduced in a manner of performing transmission by starting with an SRS dropped due to collision.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

The methods for transmitting and receiving an SRS and communication devices therefor may be industrially applied to various wireless communication systems including the 3GPP LTE/LTE-A system, the NR (5G) communication system, etc.

What is claimed is:

1. A method of transmitting a Sounding Reference Signal (SRS) by a user equipment, the method comprising:
    based on SRS transmission and transmission of an uplink channel colliding with each other in a first slot, dropping the transmission of an SRS symbol having the collision occurrence in the first slot and transmitting an SRS symbol not having the collision occurrence in the first slot; and
    transmitting an SRS symbol in a second slot based on a hopping pattern configured for the dropped SRS symbol,
    wherein based on a transmission count of a last SRS symbol not having the collision occurrence in the first slot being K, a transmission count for a first SRS symbol transmitted in the second slot is K+1 and
    wherein the second slot comprises a slot having SRS transmission configured after the first slot.

2. The method of claim 1, wherein the transmission count K does not include a transmission count for the SRS symbol having the collision occurrence.

3. The method of claim 1, wherein the hopping pattern is determined based on the transmission count.

4. The method of claim 1, wherein the transmission count of the first SRS symbol having the collision occurrence in the first slot is K+1 that is equal to the transmission count of a first symbol of the second SRS.

5. The method of claim 1, wherein information on the hopping pattern is provided through Radio Resource Control (RRC).

6. The method of claim 1, wherein the SRS includes a periodic or semi-periodic SRS and wherein the uplink signal includes Physical Uplink Control Channel (PUCCH).

7. The method of claim 1, wherein the SRS includes an aperiodic SRS and wherein the uplink signal includes Physical Uplink Control Channel (PUCCH) including a beam failure recover request.

8. A user equipment transmitting a Sounding Reference Signal (SRS), the user equipment comprising:
    a processor, and
    a Radio Frequency (RF) unit transmitting or receiving a radio signal by being combined with the processor,
    wherein the processor is configured to:
    based on SRS transmission and transmission of an uplink channel colliding with each other in a first slot, drop the transmission of an SRS symbol having the collision occurrence in the first slot, transmit an SRS symbol not having the collision occurrence in the first slot, and transmit an SRS symbol in a second slot based on a hopping pattern configured for the dropped SRS symbol, wherein based on a transmission count of a last SRS symbol not having the collision occurrence in the first slot being K, a transmission count for a first SRS symbol transmitted in the second slot is K+1, and
    wherein the second slot comprises a slot having SRS transmission configured after the first slot.

9. The user equipment of claim 8, wherein the transmission count K does not include a transmission count for the SRS symbol having the collision occurrence.

10. The user equipment of claim 8, wherein the hopping pattern is determined based on the transmission count.

11. The user equipment of claim 8, wherein the transmission count of the first SRS symbol having the collision occurrence in the first slot is K+1 that is equal to the transmission count of a first symbol of the second SRS.

12. The user equipment of claim 8, wherein information on the hopping pattern is provided through Radio Resource Control (RRC).

13. The user equipment of claim 8, wherein the SRS includes a periodic or semi-periodic SRS and wherein the uplink signal includes Physical Uplink Control Channel (PUCCH).

14. The user equipment of claim 8, wherein the SRS includes an aperiodic SRS and wherein the uplink signal includes Physical Uplink Control Channel (PUCCH) including a beam failure recover request.

* * * * *